(12) United States Patent
Patel et al.

(10) Patent No.: US 9,823,394 B2
(45) Date of Patent: Nov. 21, 2017

(54) RETROREFLECTIVE ARTICLES INCLUDING A SECURITY MARK

(71) Applicant: 3M INNOVATIVE PROPERTIES COMPANY, St. Paul, MN (US)

(72) Inventors: Suman K. Patel, Woodbury, MN (US); Bruce D. Orensteen, Bloomington, MN (US); Mikhail L. Pekurovsky, St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/344,744

(22) PCT Filed: Sep. 20, 2012

(86) PCT No.: PCT/US2012/056267
§ 371 (c)(1),
(2) Date: Mar. 13, 2014

(87) PCT Pub. No.: WO2013/043827
PCT Pub. Date: Mar. 28, 2013

(65) Prior Publication Data
US 2014/0368902 A1    Dec. 18, 2014

Related U.S. Application Data

(60) Provisional application No. 61/538,511, filed on Sep. 23, 2011.

(51) Int. Cl.
| | | |
|---|---|---|
| *G02B 5/124* | (2006.01) | |
| *B32B 37/14* | (2006.01) | |
| *G02B 5/20* | (2006.01) | |

(52) U.S. Cl.
CPC .............. *G02B 5/124* (2013.01); *B32B 37/14* (2013.01); *G02B 5/208* (2013.01); *Y10T 156/10* (2015.01)

(58) Field of Classification Search
CPC .......... G02B 5/003; G02B 5/045; G02B 5/12; G02B 5/122; G02B 5/124; G02B 5/208; G02B 5/22–5/24; B32B 3/00; B32B 37/00; B32B 37/12; B32B 37/1284; B32B 37/1292; B32B 37/14; B32B 2307/40; B32B 2307/41; B32B 2307/416; B32B 2551/00; B32B 2305/347; B29D 11/00605–11/00625; B29D 11/0073; B41M 3/14; B41M 3/148; B42D 25/30;
(Continued)

(56) References Cited

U.S. PATENT DOCUMENTS

| | | | |
|---|---|---|---|
| 4,688,894 A | | 8/1987 | Hockert |
| 5,104,719 A | * | 4/1992 | Kamen .................... B41M 3/12 156/233 |

(Continued)

FOREIGN PATENT DOCUMENTS

| | | |
|---|---|---|
| EP | 0416742 | 3/1991 |
| EP | 1821096 A2 | 8/2007 |

(Continued)

OTHER PUBLICATIONS

International Search Report for PCT International Application No. PCT/US2012/056267, dated Feb. 27, 2013, 5pgs.

*Primary Examiner* — Stephone B Allen
*Assistant Examiner* — Adam W Booher
(74) *Attorney, Agent, or Firm* — Trisha D. Adamson

(57) ABSTRACT

The present disclosure relates to prismatic retroreflective articles that includes a security mark and to methods of making such articles.

22 Claims, 3 Drawing Sheets

(58) Field of Classification Search
CPC .............. B42D 25/382; B42D 2035/00; B42D 2035/20; B42D 2035/24; B42D 2035/26; B42D 2035/34; G06K 19/06; G06K 19/06009; G06K 19/06103; G06K 19/0614; Y10T 156/10; G03G 21/04–21/046
USPC .................... 283/72, 85, 87, 88, 91, 94, 114
See application file for complete search history.

(56) References Cited

U.S. PATENT DOCUMENTS

| | | |
|---|---|---|
| 5,591,527 A | 1/1997 | Lu |
| 5,614,286 A | 3/1997 | Bacon, Jr. |
| 5,885,677 A | 3/1999 | Gosselin |
| 6,568,817 B1 | 5/2003 | Mimura |
| 6,677,030 B2 | 1/2004 | Thakkar |
| 7,387,393 B2 | 6/2008 | Reich et al. |
| 7,422,334 B2 | 9/2008 | Smith |
| 7,667,895 B2 * | 2/2010 | Argoitia et al. .............. 359/576 |
| 7,995,278 B2 | 8/2011 | Endle |
| 8,177,374 B2 | 5/2012 | Wu |
| 2003/0111542 A1 | 6/2003 | Look |
| 2011/0211257 A1 | 9/2011 | Hannington |

FOREIGN PATENT DOCUMENTS

| | | |
|---|---|---|
| EP | 2343198 | 7/2011 |
| WO | WO 2011-129832 | 10/2011 |
| WO | WO 2013-044000 | 3/2013 |

\* cited by examiner

RETROREFLECTIVE ARTICLES INCLUDING A SECURITY MARK

BACKGROUND

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are optical element sheeting (e.g., cube corner sheeting) and microsphere-based sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Cube corner retroreflective sheeting, sometimes referred to as "prismatic" sheeting, typically comprises a thin transparent layer having a substantially planar first surface and a second structured surface comprising a plurality of geometric structures, some or all of which include three reflective faces configured as a cube corner element.

A cube corner element can include three mutually perpendicular optical faces that intersect at a single apex. Generally, light that is incident on a corner cube element from a light source is totally internally reflected from each of the three perpendicular cube corner optical faces and is redirected back toward the light source. Presence of, for example, dirt, water, and adhesive on the optical faces can prevent total internal reflection (TIR) and lead to a reduction in the retroreflected light intensity.

Security marks are used to indicate that an article is authentic. Security marks have been used on beaded retroreflective sheeting. For example, U.S. Pat. No. 4,688,894 describes a security mark for use on beaded retroreflective sheeting having the ability to be optically variable based on viewing angle. U.S. Pat. No. 7,995,278 describes a security mark for use on beaded retroreflective sheeting that appears to float or sink along the article sheeting surface.

BRIEF SUMMARY

The inventors of the present application recognized a need for security marks capable of use on prismatic retroreflective sheeting. The present disclosure relates to prismatic retroreflective articles that includes a security mark and to methods of making such articles.

In one illustrative embodiment, a retroreflective article includes a retroreflective layer including multiple cube corner elements that collectively form a structured surface; one or more barrier layers positioned adjacent to the structured surface; and a conforming layer positioned adjacent to the one or more barrier layers; wherein one or more of the layers in combination form a security mark having a first portion including a first characteristic and a second portion including a second characteristic, wherein the characteristic is one of color and infra-red absorbency. For purposes of clarity, the one or more barrier layers have a characteristic that varies from a characteristic in one of (1) the areas not including the one or more barrier layers or (2) another barrier layer. Exemplary characteristics include, for example, color and infrared absorbency.

In some embodiments, at least some of the first and second portions overlap. In some embodiments, the first and second portions do not overlap. In some embodiments, the barrier layers are applied to the conforming layer. In some embodiments, the barrier layers are applied to at least a portion of the structured surface. In some embodiments, the one or more barrier layers cover less than 100% of the structured surface. In some embodiments, the structured surface that is adjacent to the one or more barrier layers is optically active and the portion of the structured surface not adjacent to the one or more barrier layers is not optically active. In some embodiments, the conforming layer is an adhesive. In some embodiments, the adhesive is optically opaque. In some embodiments, the security mark can be distinguished from the background by a viewer in both ambient light and in retroreflection. In some embodiments, the security mark can be distinguished from the background by a viewer in ambient light, but not in retroreflection.

In another illustrative embodiment, a method of forming a retroreflective article includes providing a retroreflective layer including multiple cube corner elements that collectively form a structured surface; positioning one or more barrier layers adjacent to the structured surface to form a security mark having a first portion including a first characteristic and a second portion including a second characteristic, wherein the characteristic is one of color and infra-red absorbency; positioning a conforming layer adjacent to the one or more barrier layers; and laminating the layers.

In some embodiments, the method further includes forming a pattern of the one or more barrier layers on the conforming layer before the laminating step. In some embodiments, the method further includes forming a pattern on one or more of the barrier layers before the laminating step. In some embodiments, the method further includes patterning the one or more barrier layers onto the conforming layer before the laminating step to form a security mark void; and patterning another barrier layer into the security mark void, wherein the barrier layer and the security mark do not substantially overlap. In some embodiments, the one or more barrier layers are formed by curing a polymer-containing layer before the laminating step. In some embodiments, the one or more barrier layers are printed onto the conforming layer. In some embodiments, the laminating step encapsulates air between the structured surface and the one or more barrier layers. In some embodiments, the security mark can be distinguished from the background by a viewer in both ambient light and in retroreflection. In some embodiment, the security mark can be distinguished from the background by a viewer in ambient light, but not in retroreflection. In some embodiments, the confirming layer is an adhesive. In some embodiments, the adhesive is a pressure sensitive adhesive. In some embodiments, the adhesive is optically opaque. In some embodiments, the security mark exhibits variable retroreflectivity.

These and various other features and advantages will be apparent from a reading of the following detailed description.

BRIEF DESCRIPTION OF THE DRAWINGS

The disclosure may be more completely understood in view of the following detailed description of various embodiments of the disclosure in connection with the accompanying drawings, in which.

The figures are not to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

The present disclosure relates to prismatic retroreflective articles that includes a security mark and to methods of making such articles. The term "security mark" refers to an element on or in a retroreflective film that can be used to authenticate the article. The security marks of the present application can be continuous or discontinuous.

Figure 1A:
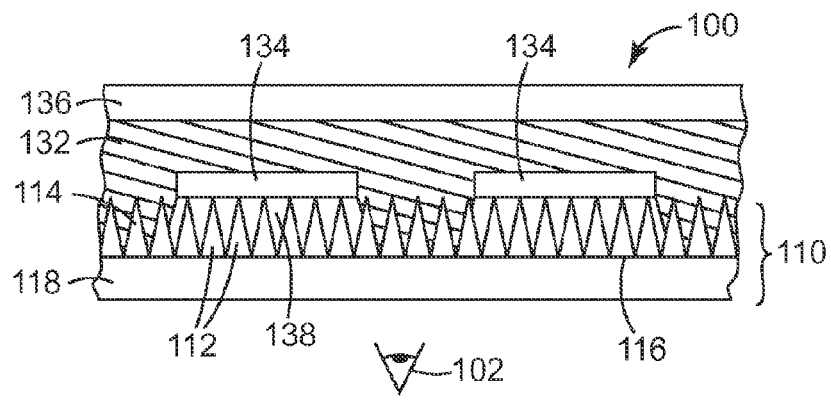
FIGS. 1A and 1B are schematic side views of one exemplary embodiment of a retroreflective article.
Figure 1B:
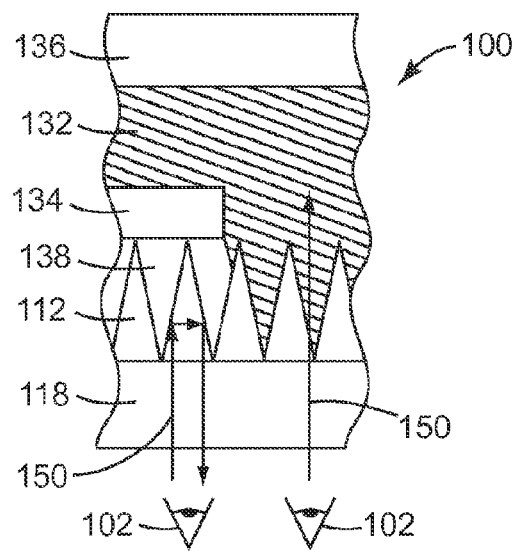

FIGS. 1A and 1B are schematic side views of one exemplary embodiment of a retroreflective article 100 that faces a viewer 102. Retroreflective article 100 includes a retroreflective layer 110 including multiple cube corner elements 112 that collectively form a structured surface 114 opposite a major surface 116. The optical elements can be full cubes, truncated cubes, or preferred geometry (PG) cubes as described in, for example, U.S. Pat. No. 7,422,334, incorporated herein by reference. The specific retroreflective layer 110 shown in FIGS. 1A and 1B includes an overlay layer 118 (also referred to as a top film), but those of skill will appreciate that some embodiments do not include an overlay layer. One or more barrier layers 134 are positioned between retroreflective layer 110 and conforming layer 132. Barrier layers 134 form a physical "barrier" between cube corner elements 112 and conforming layer 132. Barrier layer 134 can directly contact or be spaced apart from or can push slightly into the tips of cube corner elements 112. Barrier layers 134 have a characteristic that varies from a characteristic in one of (1) the areas not including barrier layers 134 or (2) another barrier layer 134. Exemplary characteristics include, for example, color and infrared absorbency.

In general, any material that prevents the conforming layer material from contacting cube corner elements 112 or flowing or creeping into low refractive index area 138 can be used to form the barrier layer Exemplary materials for use in barrier layer 134 include resins, polymeric materials, dyes, inks (including color-shifting inks), vinyl, inorganic materials, UV-curable polymers, multi-layer optical films (including, for example, color-shifting multi-layer optical films), pigments, particles, and beads. The size and spacing of the one or more barrier layers can be varied. In some embodiments, the barrier layers may form a pattern on the retroreflective sheeting. In some embodiments, one may wish to reduce the visibility of the pattern on the sheeting. In general, any desired pattern can be generated by combinations of the described techniques, including, for example, indicia such as letters, words, alphanumerics, symbols, graphics, logos, or pictures. The patterns can also be continuous, discontinuous, monotonic, dotted, serpentine, any smoothly varying function, stripes, varying in the machine direction, the transverse direction, or both; the pattern can form an image, logo, or text, and the pattern can include patterned coatings and/or perforations. The pattern can include, for example, an irregular pattern, a regular pattern, a grid, words, graphics, images lines, and intersecting zones that form cells.

A low refractive index area 138 is positioned between (1) one or both of barrier layer 134 and conforming layer 132 and (2) cube corner elements 112. The low refractive index area 138 facilitates total internal reflection such that light that is incident on cube corner elements 112 adjacent to a low refractive index area 138 is retroreflected. As is shown in FIG. 1B, a light ray 150 incident on a cube corner element 112 that is adjacent to low refractive index layer 138 is retroreflected back to viewer 102. For this reason, an area of retroreflective article 100 that includes low refractive index layer 138 can be referred to as an optically active area. In contrast, an area of retroreflective article 100 that does not include low refractive index layer 138 can be referred to as an optically inactive area because it does not substantially retroreflect incident light. As used herein, the term "optically inactive area" refers to an area that is at least 50% less optically active (e.g., retroreflective) than an optically active area. In some embodiments, the optically inactive area is at least 40% less optically active, or at least 30% less optically active, or at least 20% less optically active, or at least 10% less optically active, or at least at least 5% less optically active than an optically active area.

Low refractive index layer 138 includes a material that has a refractive index that is less than about 1.30, less than about 1.25, less than about 1.2, less than about 1.15, less than about 1.10, or less than about 1.05. In general, any material that prevents the conforming layer material from contacting cube corner elements 112 or flowing or creeping into low refractive index area 138 can be used as the low refractive index material. In some embodiments, barrier layer 134 has sufficient structural integrity to prevent conforming layer 132 from flowing into a low refractive index area 138. In such embodiments, low refractive index area may include, for example, a gas (e.g., air, nitrogen, argon, and the like). In other embodiments, low refractive index area includes a solid or liquid substance that can flow into or be pressed into or onto cube corner elements 112. Exemplary materials include, for example, ultra-low index coatings (those described in PCT Patent Application No. PCT/US2010/031290), and gels.

The portions of conforming layer 132 that are adjacent to or in contact with cube corner elements 112 form non-optically active (e.g., non-retroreflective) areas or cells. In some embodiments, conforming layer 132 is optically opaque. In some embodiments conforming layer 132 has a white color.

In some embodiments, conforming layer 132 is an adhesive. Exemplary adhesives include those described in PCT Patent Application No. PCT/US2010/031290. Where the conforming layer is an adhesive, the conforming layer may assist in holding the entire retroreflective construction together and/or the viscoelastic nature of barrier layers 134 may prevent wetting of cube tips or surfaces either initially during fabrication of the retroreflective article or over time.

In some embodiments, conforming layer 132 is a pressure sensitive adhesive. The PSTC (pressure sensitive tape council) definition of a pressure sensitive adhesive is an adhesive that is permanently tacky at room temperature which adheres to a variety of surfaces with light pressure (finger pressure) with no phase change (liquid to solid). While most adhesives (e.g., hot melt adhesives) require both heat and pressure to conform, pressure sensitive adhesives typically only require pressure to conform. Exemplary pressure sensitive adhesives include those described in U.S. Pat. No. 6,677,030. Barrier layers 134 may also prevent the pressure sensitive adhesive from wetting out the cube corner sheeting.

In some embodiments, conforming layer 132 includes a sealing film 136 that assists in holding the construction together. Some sealing films require heat and pressure to conform.

In one exemplary embodiment, one or more barrier layers are printed in a first region (e.g., a background region) with one (or more) first colors, and one or more barrier layers are printed in a second region (e.g., a security mark region) with one or more second colors. The first and second regions combine to create a security mark. In this embodiment, the security mark is defined by the color differential between the first region and the second region.

In some exemplary embodiments, the security mark is visible in ambient light (the visible spectrum) and "disappears" in retroreflection. This could be done, for example, by making a security mark with colored areas that have the same size, shape, and/or spacing as the background but at least one color that is different from the background color. In ambient light, the different colors make the mark apparent. However, because the color of the areas including barrier material(s) does not affect the appearance of the film in retroreflected light, the mark looks effectively the same as the background.

In some embodiments, the security mark is visible in retroreflection and is not substantially visible in ambient light. This could be done, for example, by creating an image area having a higher percentage coverage of conforming material than adjacent areas, and in the same image area, using a pigment to adjust the conforming layer to have a lower cap-Y (i.e., grayer appearance) than the adjacent conforming material. The result is that both areas appear the same color in diffuse light. The image area appears less reflective in retroreflection. Alternatively, this could be done by, for example, using barriers layers having dissimilar colors that do not have a high degree of contrast between the colors.

Retroreflective layer 110 of FIGS. 1A and 1B is shown as including overlay layer 118 and no land layer or land portion. The term "land layer" as used in the present application refers to a continuous layer of material coextensive with the cube corner elements and composed of the same material. Those of skill in the art will appreciate that retroreflective layer 110 can include a land layer or land portion. A construction without a land layer may be desirable for flexible embodiments.

In some embodiments, one or more barrier layers are printed on a film that is later positioned adjacent to the structured surface of the retroreflective layer.

Figure 2:
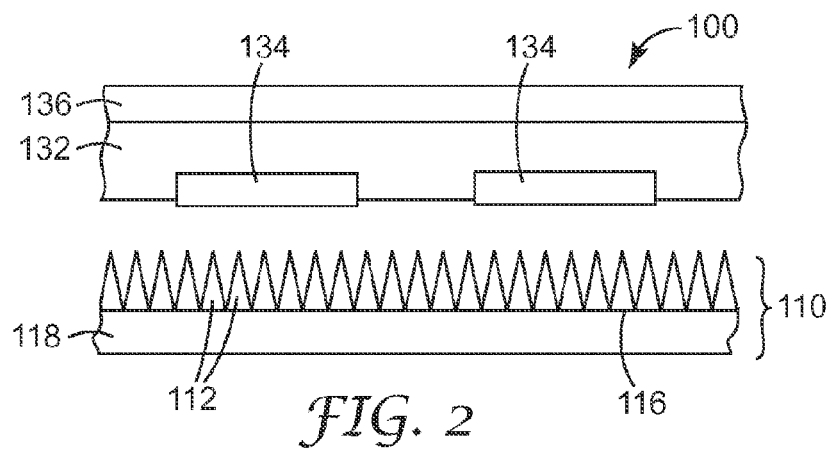
FIG. 2 is schematic drawing of one exemplary intermediary step that can be used in forming a retroreflective article.

One implementation of these embodiments is schematically shown in FIG. 2. FIG. 2 shows one method of making at least some of the retroreflective articles of the present disclosure involves placing barrier layer material 134 onto a pressure sensitive adhesive material 132 and then laminating the resulting pressure sensitive adhesive layer 130 to a retroreflective layer 110. The pressure sensitive adhesive layer 130 can be formed in a variety of ways including but not limited to the following exemplary methods. In one exemplary embodiment, the material(s) forming the barrier layer are printed onto the pressure sensitive adhesive. The method of printing can be, a non-contact method such as, for example, printing using an inkjet printer. The method of printing can be a contact printing method such as, for example, flexographic printing. In another exemplary embodiment, the material(s) forming the barrier layer are printed onto a flat release surface using, for example, an inkjet or screen printing method, and are then subsequently transferred from the flat release surface onto the pressure sensitive adhesive. In another exemplary embodiment, the material(s) forming the barrier layer are flood coated onto a microstructured surface. The barrier layer material is subsequently transferred from the microstructured surface to the pressure sensitive adhesive by, for example, lamination. The structured surface is removed after lamination to provide a pressure sensitive adhesive with barrier layers that is laminated to a retroreflective layer to make the retroreflective article. The retroreflective article may then, optionally, be adhesively bonded to a substrate (e.g., an aluminum substrate) to form, for example, a license plate or signage.

Figure 3:
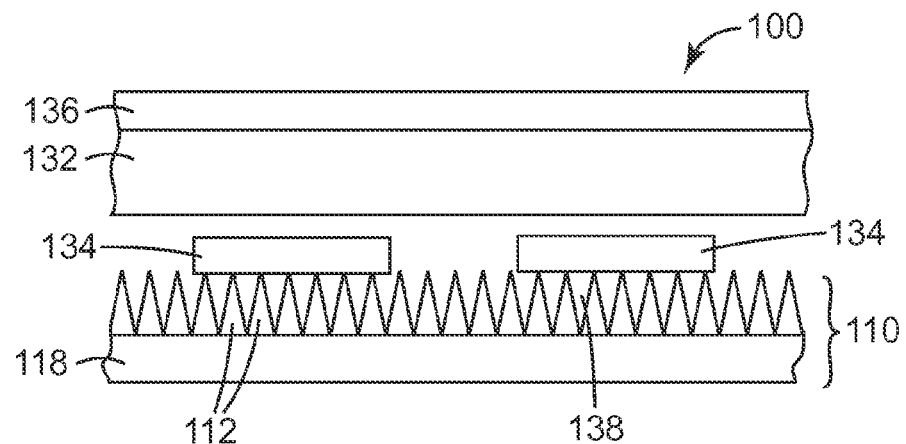
FIG. 3 is schematic drawing of one exemplary intermediary step that can be used in forming a retroreflective article.

In some embodiments, one or more barrier layers are applied (e.g., printed) on the cube corner elements and a film layer is later placed on top of the barrier layers and cube corner elements. One implementation of these embodiments is schematically shown in FIG. 3.

Figure 4:
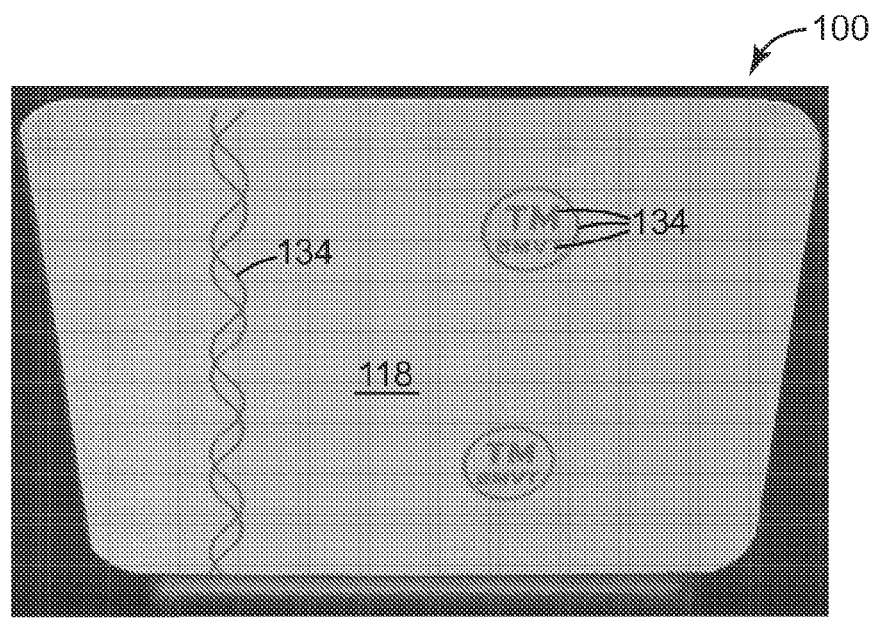
FIG. 4 is a photograph from a front view of an illustrative retroreflective article with security markings.

FIG. 4 is a front view of an illustrative retroreflective article 100 with two separate security markings 134. The retroreflective article 100 shown has a white, opaque, retroreflective background and black or gray security markings 134. Under ambient light, the security markings 134 appear black or gray and under retroreflection the security markings 134 appear brighter than the surrounding background.

Figure 5:
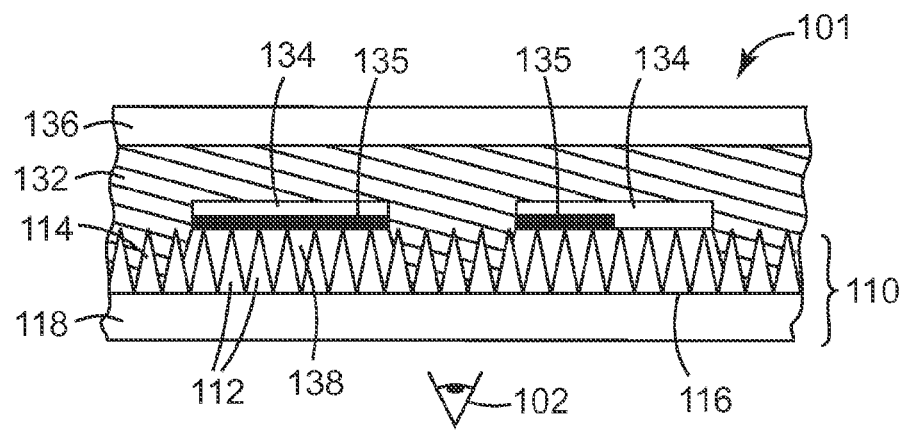
FIG. 5 is a schematic side view of another exemplary embodiment of a retroreflective article.
Figure 6:
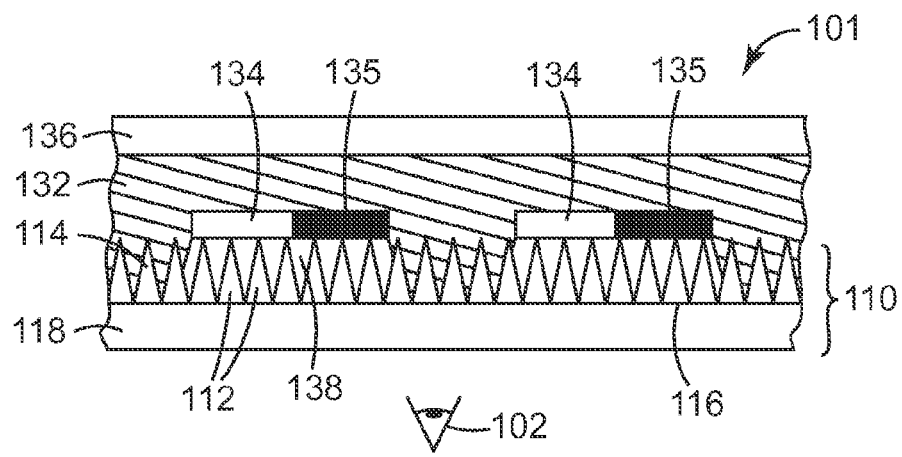
FIG. 6 is a schematic side view of another exemplary embodiment of a retroreflective article.

FIGS. 5 and 6 are a schematic side view of another exemplary embodiment of a retroreflective article 101. This embodiment is similar to FIGS. 1A and 1B except that multiple barrier layers 134 and 135 are shown. The barrier layers in FIG. 5 are overlapping, and the barrier layers in FIG. 6 are not substantially overlapping. Those of skill in the art will appreciate that in some embodiments, the barrier layers partially overlap.

With specific reference to the embodiment shown in FIG. 5, the different barrier layers 134 and 135 can have the same or similar physical properties or can have different physical properties. In some embodiments, barrier layers 134 and 135 do not have the same color. In some embodiments, barrier layer 134 is clear or colorless while barrier layer 135 has a color and/or is opaque. In some embodiments, barrier layer 134 and conforming layer 132 have the same color (e.g., white). Barrier layer 135 can have a color that is different than either or both of pressure sensitive adhesive layer 132 and barrier layer 134.

With specific reference to the embodiment shown in FIG. 6, this security marking can be formed by, for example, first patterning (e.g., printing) barrier layer 134 onto the conforming layer 132 where the barrier layer 135 defines a security mark void and then patterning barrier layer 135 into the security mark void. Thus, barrier layer 134 and barrier layer 135 are not overlapping.

In some embodiments, the security mark changes appearance to a viewer as the viewer changes their point of view.

For example, as the observation angle and/or entrance angle changes, the appearance of the security mark changes.

In some embodiments, the conforming layer conforms less than completely in the optically inactive areas. The optical effect of this is that the optically inactive areas may be partially or somewhat optically active (e.g., retroreflective). In other words, the retroreflectivity or lack thereof can be varied in both the optically inactive and optically active areas. The conformance of the conforming layer can be modified to create this optical effect.

Some embodiments of the security marks described in the present application do not interfere with reading of the license plate characters. This means that the security mark does not interfere with reading of the license plate alphanumerics in at least one light spectrum, e.g., visible, infrared, retroreflection. In some embodiments, the security feature(s) on a license plates can be read by optical character recognition cameras without confusion between the alphanumeric characters that form the license plate number and the security marks.

Some embodiments of the security marks described in the present application increase or decrease the retroreflectivity of certain areas of the security mark relative to the background area. By comparison, prior art security marks on beaded sheeting could only decrease the retroreflectivity. Increasing or decreasing the retroreflectivity of certain areas of the security mark can be done, for example, by varying the dimensions and/or percent optically active area of repeating units in a pattern of barrier layers.

Some embodiments of the security marks described in the present application increase or decrease the whiteness or CAP-Y of certain areas of the security mark relative to the background area. Increasing or decreasing the whiteness or CAP-Y of certain areas of the security mark can be done, for example, by varying the dimensions and/or percent optically active area of repeating units in a pattern of barrier layers. Alternatively or additionally, the barrier material can be white, which could, in some embodiments, increase the CAP-Y of the security mark in comparison with the background area.

All references mentioned herein are incorporated by reference.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if a cell depicted in the figures is turned over or flipped over, portions previously described as below or beneath other elements would then be above those other elements.

Embodiments of the present disclosure are disclosed. The disclosed embodiments are presented for purposes of illustration and not limitation. The implementations described above and other implementations are within the scope of the following claims. One skilled in the art will appreciate that the present disclosure can be practiced with embodiments other than those disclosed. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the present disclosure. The scope of the present application should, therefore, be determined only by the following claims.

What is claimed is:

1. A retroreflective article, comprising:
   a retroreflective layer including multiple cube corner elements that collectively form a structured surface;
   one or more barrier layers positioned adjacent to the structured surface creating low refractive index areas between the barrier layers and the structured surface having a lower index of refraction than the retroreflective layer; and
   a conforming adhesive layer positioned adjacent to the one or more barrier layers, wherein the conforming layer is optically opaque;
   wherein one or more of the layers in combination form a security mark having a first portion including a first characteristic and a second portion including a second characteristic different from the first characteristic, wherein the characteristic is one of color and infra-red absorbency;
   wherein the first and second portions do not overlap, and wherein the conforming adhesive layer further comprises a portion of the security mark by adjusting a color of the conforming layer material forming such portion to have a grayer appearance than adjacent conforming layer material such that the portion and adjacent conforming layer material appear the same color in diffuse light.

2. The retroreflective article of claim 1, wherein at least some of the first and second portions overlap forming a contiguous multiple different color barrier layer, and wherein the security mark is defined by a color differential between the first and second portions of the contiguous barrier layer.

3. The retroreflective article of claim 1, wherein one or more of the barrier layers are applied to the conforming layer wherein such one or more barrier layers have dissimilar colors that do not have a high degree of contrast between the dissimilar colors.

4. The retroreflective article of claim 1, wherein one or more of the barrier layers are applied to at least a portion of the structured surface and wherein the security mark is visible in retroreflection and not as visible in ambient light.

5. The retroreflective article of claim 1, wherein the one or more barrier layers cover less than 100% of the structured surface.

6. The retroreflective article of claim 1, wherein the portion of the structured surface adjacent to the one or more barrier layers is optically active and the portion of the structured surface not adjacent to the one or more barrier layers is not optically active.

7. The retroreflective article of claim 1, wherein the conforming layer is an adhesive.

8. The retroreflective article of claim 1, wherein the security mark can be distinguished from a background by a viewer in both ambient light and in retroreflection.

9. The retroreflective article of claim 1, wherein the security mark can be distinguished from a background by a viewer in ambient light, but not in retroreflection.

10. The retroreflective article of claim 1, wherein the one or more barrier layers have a characteristic that varies from a characteristic in one of (1) the areas not including the one or more barrier layers or (2) another barrier layer.

11. A method of forming a retroreflective article, comprising:
providing a retroreflective layer including multiple cube corner elements that collectively form a structured surface;
positioning one or more barrier layers adjacent to the structured surface to form a security mark having a first portion including a first characteristic and a second portion including a second characteristic different from the first characteristic, wherein the characteristic is one of color and infra-red absorbency creating low refractive index areas between the barrier layers and the structured surface having a lower index of refraction than the retroreflective layer;
positioning a conforming adhesive layer adjacent to the one or more barrier layers, wherein the conforming layer is optically opaque; and
laminating the layers;
wherein the first and second portions do not overlap, and wherein the conforming adhesive layer further comprises a portion of the security mark by adjusting a color of the conforming layer material forming such portion to have a grayer appearance than adjacent conforming layer material such that the portion and adjacent conforming layer material appear the same color in diffuse light.

12. The method of claim 11, further comprising:
forming a pattern of the one or more barrier layers on the conforming layer before the laminating step such that the security mark is visible in retroreflection and not as visible in ambient light.

13. The method of claim 11, further comprising:
forming a pattern on one or more of the barrier layers before the laminating step.

14. The method of claim 11, further comprising:
patterning the one or more barrier layers onto the conforming layer before the laminating step to form a security mark void; and
patterning another barrier layer into the security mark void, wherein the another barrier layer and the security mark do not substantially overlap.

15. The method of claim 11, wherein the one or more barrier layers is formed by curing a polymer-containing layer before the laminating step.

16. The method of claim 11, wherein the one or more barrier layers is printed onto the conforming layer.

17. The method of claim 11, wherein the laminating step encapsulates air between the structured surface and the one or more barrier layers.

18. The method of claim 11, wherein the security mark can be distinguished from the background by a viewer in both ambient light and in retroreflection.

19. The method of claim 11, wherein the security mark can be distinguished from the background by a viewer in ambient light, but not in retroreflection.

20. The method of claim 11, wherein the adhesive is a pressure sensitive adhesive.

21. The method of claim 11, wherein the security mark exhibits variable retroreflectivity.

22. The method of claim 11, wherein the one or more barrier layers have a characteristic that varies from a characteristic in one of (1) the areas not including the one or more barrier layers or (2) another barrier layer.

* * * * *